Jan. 4, 1944.  N. TRBOJEVICH  2,338,366
HOB
Filed Dec. 22, 1942
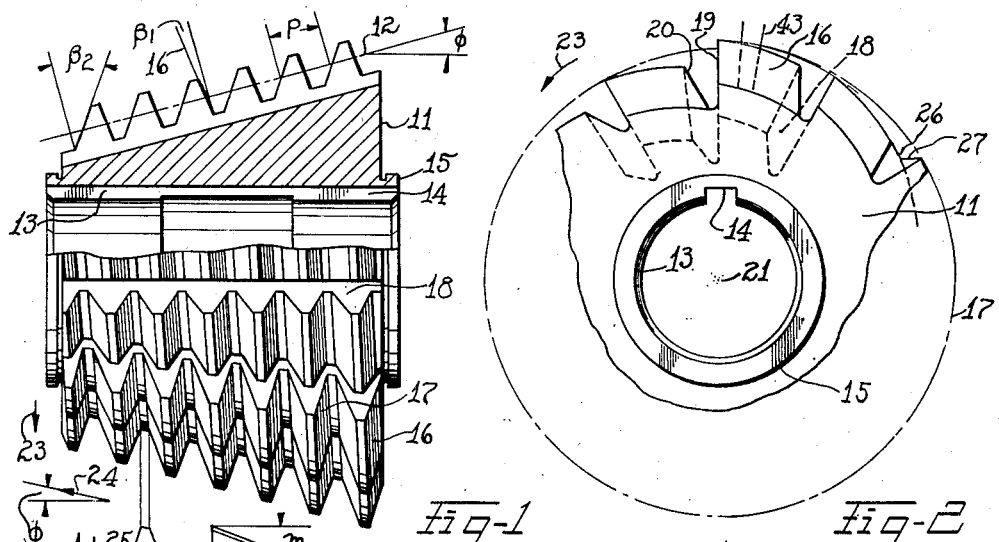
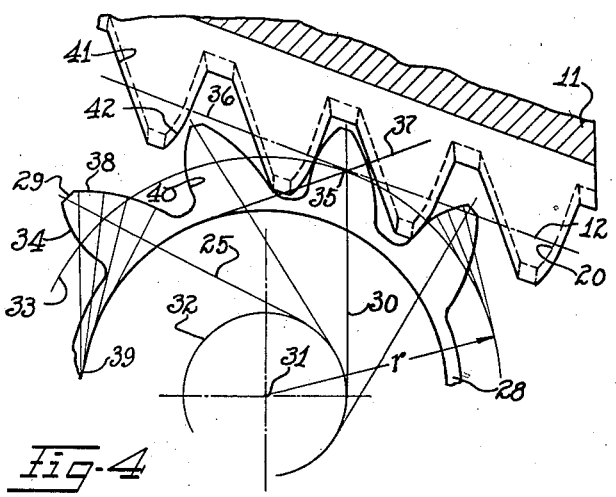
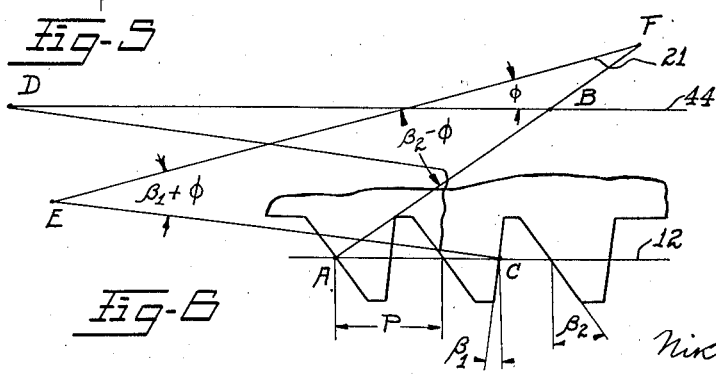
INVENTOR.
Nikola Trbojevich Patented Jan. 4, 1944

2,338,366

UNITED STATES PATENT OFFICE 2,338,366

HOB

Nikola Trbojevich, Toledo, Ohio

Application December 22, 1942, Serial No. 469,819

2 Claims. (Cl. 29—103)

The invention relates to an improvement in taper hobs adapted to generate cylindrical pinions and gears having asymmetrical tooth cross contours and longitudinally curved teeth.

In particular, the application is a continuation in part of my co-pending application Serial No. 404,882 filed July 31, 1941, since matured into the Patent No. 2,311,006 dated February 16, 1943.

In the said co-pending application I described the principle of asymmetrical teeth as applied to cylindrical members and as a means of equalizing the relative radii of curvature and the Hertz stresses in the said members when the mating gear member is non-cylindrical, e. g., a hyperboloid, a cone or a plane crown gear also having curved and asymmetrical teeth. I also described therein the structure and the principle of operation of the taper hob forming the subject matter of this application.

The object is to devise a tool capable of generating the said cylindrical members having asymmetrical tooth cross contours and longitudinally curved teeth efficiently and without interference.

Another specific object is to generate worm gears of the type shown in my copending application Ser. No. 477,332, filed Feb. 27, 1943, Figure 8.

In the drawing:

Figure 1 is the elevation of the new taper hob.

Figure 2 is a fragmentary end view of the large end of the hob.

Figures 3 and 3a show two views of the relieving tool used in the manufacture of the hob.

Figure 4 diagrammatically shows the new hob in the process of generating asymmetric tooth curves in a blank.

Figure 5 is a diagrammatic view of the hob and gear as set up in a hobbing machine in which the gear is cut.

Figure 6 is a geometrical diagram explanatory of the theory of the hob.

As shown in Figures 1 and 2, the new hob consists of a conical body 11 having a pitch cone 12, a hole 13, a keyway 14 and two accurately finished flanges 15 at its two ends for the purpose of testing the true running of the said hob. The cutting teeth 16 are aligned in one or more constant pitch curves 17 which might be termed as conical helixes, in a plurality of convolutions all around the conical circumference of the hob and are further aligned in a series of banks or racks by means of longitudinally disposed straight or curved, but usually straight, cutting flutes 18 to provide cutting edges. The cross contour of the flutes consists of two straight lines 19 and 20 respectively forming an acute angle with each other in such a manner that the first of the said lines 19 is radial and passes through the axis 21 of the hob to form the cutting facets and the other line 20 is offset therefrom to form the rear ends of the said teeth.

The cross contours of the cutting teeth 16 as viewed along the generator of the pitch cone 12 present a rack of a constant pitch P having two unequal pressure angles $\beta_1$ and $\beta_2$ at the opposite sides of the said teeth, a smaller angle $\beta_1$ and a greater one $\beta_2$. The difference between the two pressure angles is usually quite considerable, as much as thirty or forty degrees, the said pressure angles being equal to the corresponding pressure angles in the asymmetric helical gear which the hob is going to generate. It is interesting to note that the larger pressure angle $\beta_2$ according to this invention is always on the side of tooth facing towards the cone apex of the hob.

The cutting teeth 16 are relieved or backed off in order that the cutting facets 19 in the fronts of the said teeth may stand out prominently and a rubbing action of the rear ends of the said teeth with the finished gear tooth surfaces may be avoided. To this end a back off tool 22, see Figures 3 and 3a, is constructed of a profile corresponding to the spaces existing between the adjacent hob teeth 16 and having a cutting clearance angle $m$. In backing off the teeth, the operation performed is broadly analogous to the operation used in the case of the ordinary hobs, i. e., the hob is rotated in the direction of the arrow 23, the tool is translated in the direction of the arrow 24 parallel to the cone generator 12 in a timed relation with the rotation of the hobs to produce the conical helix 17 and in addition, the tool is reciprocated in the direction of the arrows 25 in a direction usually perpendicular to the hob axis, but theoretically not necessarily exactly so, to provide a cutting clearance in the hob teeth. Thus, the hob teeth 16 are aligned along the conical helix 17 as already stated, which helix in a projection upon a plane perpendicular to the hob axis 21 becomes an Archimedean spiral, see Figure 2, and further, due to the constant velocity motion of the tool 22 in the direction of the arrows 25 and transversely relative to the hob axis, the tops and sides of the said cutting teeth 16 behind the cutting facets 19 are formed into surfaces consisting of another series of conical helixes 26 forming an angle (the clearance angle) with the first series. This second series of curves appear as Archimedean spiral segments 26 in the projection shown in Figure 2. The return from one such segment 26 to the next one is accomplished by means of a steep spiral segment 27, the so-called "jump" of the back-off tool, similarly to the well-known procedure employed in the manufacture of ordinary hobs, the said jumps being timed to correspond exactly to the number of the flutes 18 in the hob.

In Figures 4 and 5 the action and the positioning of the new hob when generating an asymmetric-toothed helical pinion 28 is diagrammatically shown. The pinion teeth 29 have axes 30 all offset from the axis of rotation 31 at the same distance thus making them all tangent to the circle 32, and equispaced. The pitch circle 33 (which also may serve as the base for the driving flank 34) is next drawn thus determining the pitch point 35. The first line of action 36 (for the driving side) is drawn tangent to the pitch circle 33 and the second line of action 37 for the coasting side 38 is drawn symmetrically of the first line. This determines the base circle 39 at the coasting side. The tooth flank 38 is an involute from top to bottom drawn from the base circle 39 while the opposite flank 34 is partly an involute, at its addendum, and partly a radial line 40 at its dedendum.

The taper hob 11 having a pitch line identical with the cone generator 12 and a plurality of equispaced rack teeth which are asymmetrical relative to the said pitch line as already stated is tangent to the pitch circle 33 of the gear 28 at the offset point 35. In the involute system of gearing the hob tooth profiles are the straight lines 41 perpendicular to the corresponding lines of action, one for each side of the said teeth. The non-involute portion 40 (if any) of the pinion tooth 29 is generated by means of a conjugate curve 42 formed in the hob tooth. The rear ends 20 of the backed off hob teeth are shown with dotted lines and indicate that by relieving the hob teeth according to the method previously explained, the pitch, the thickness and the cross contour of the hob teeth does not change after repeated sharpenings providing that the said sharpenings are effected in successive axial planes 43, Figure 2.

In hobbing the pinion 28 in an ordinary hobbing machine the hob and pinion are selected to be preferably of the same "hand" but of different helix angles. In such a case the pinion axis 31 and the hob axis 21 will be disposed in two parallel planes and will relatively include an angle equal to the difference existing between the helix angle of the pinion and the thread angle of the hob. The hob and pinion are then rotated in a timed relation, the ratio of which depends not only upon the number of the teeth in the pinion and the number of threads or leads in the hob but also upon the rate of feed along the line of contact 36, in other words, similarly to the procedure employed in the case of ordinary hobs used for generation of helical gears.

The theory of this hob will now be explained. As diagrammatically shown in Figure 6, an asymmetric-toothed rack of a constant pitch P having a greater pressure angle $\beta_2$ at one side of the tooth and a smaller angle at the other side, may be theoretically rotated about various axes of rotation such as the two axes 44 and 21 shown in the drawing and also simultaneously translated in the direction of the arrow 24 parallel to the pitch line. Either one of these two modifications is theoretically equivalent to a hob and in particular, the rotation about the axis 44 which is parallel to the pitch line 12, produces a conventional or cylindrical hob and the rotation about the axis 21 inclined at an angle $\phi$ relative to the first axis produces the new conical hob.

Each hob tooth may be considered as a double cone formed with reference to the axes of rotation 44 or 21. The normal radius of curvature of any cone is equal to the length of the normal dropped from the axis upon a predetermined point of the generator according to the known geometrical rule. Preselecting now two points A and C in the generators of the said double cones, the point A corresponding to the greater pressure angle $\beta_2$ has the radii of curvature in the said two hobs equal to AB and AF respectively while the point C corresponding to the lesser pressure angle $\beta_1$ has the radii CD and CE. Or, numerically:

$$AB = \frac{R}{\sin \beta_2} \quad (1)$$

$$CD = \frac{R}{\sin \beta_1} \quad (2)$$

$$AF = \frac{R'}{\sin (\beta_2 - \phi)} \quad (3)$$

$$CE = \frac{R'}{\sin (\beta_1 + \phi)} \quad (4)$$

in which R denotes the radius of the cylindrical hob having an axis 44 and R' the radius of the taper hob having the axis 21.

Inasmuch as $$\beta_2 > \beta_1 \quad (5)$$

and the difference between the said two pressure angles $\beta_2$ and $\beta_1$ is usually very considerable as already stated, it is apparent from the inspection of the above equations that the radii AB and CD of the cylindrical hob widely differ from each other and usually, as in the case of the contemplated asymmetric toothed gearing, one radius may be from seven to ten times as long as the other while, on the other hand, the radii AF and CE of the taper hob are more one like the other in magnitude. Thus, in particular, the latter two radii will be exactly equal to each other whenever:

$$\beta_2 - \phi = \beta_1 + \phi \quad (6)$$

or $$\phi = \frac{\beta_2 - \beta_1}{2} \quad (7)$$

from the Equations 3 and 4, i. e., whenever the normal to the pitch cone of the hob bisects the two pressure angles, that is, longitudinally bisects the hob tooth.

Thus my invention consists in forming a taper hob having an asymmetrically toothed rack cross contour in its axial plane and in so selecting the cone angle $\phi$ that the radii of curvature at the two sides of the (asymmetric) hob teeth will become substantially equal to each other. By this means the cutting action of the hob is very considerably improved.

What I claim is:

1. A hob for generating gears having curved and asymmetrical teeth comprising a truncated conical body and a plurality of helicoidal relieved cutting teeth disposed about the said body in a plurality of equispaced convolutions in which the cross contours of the said teeth are of a trapezoidal form having unequal pressure angles at their opposite sides, in which the greater of the said two pressure angles faces the cone apex of the hob and in which the cone angle of the hob is so selected that it substantially forms an arithmetical mean of the difference between the said two pressure angles.

2. A taper hob having a conical pitch surface and a plurality of equispaced convolutions consisting of non-symmetrical trapezoidal cutting teeth, in which the arrangement is such that the bisectors of the said teeth intersect the hob axis substantially at right angles.

NIKOLA TRBOJEVICH.